United States Patent
Frey et al.

(10) Patent No.: US 9,915,315 B2
(45) Date of Patent: Mar. 13, 2018

(54) PRODUCTION OF MULTI-PART, JOINED VALVE COMPONENTS IN HYDRAULIC APPLICATIONS WITH JOINT SEALING PROFILES

(71) Applicants: Sascha Frey, Troisdorf (DE); Rainer Gruber, Wachtberg (DE)

(72) Inventors: Sascha Frey, Troisdorf (DE); Rainer Gruber, Wachtberg (DE)

(73) Assignee: GKN Sinter Metals Holdings GmbH, Radevormwald (DE)

( * ) Notice: Subject to any disclaimer, the term of this patent is extended or adjusted under 35 U.S.C. 154(b) by 0 days.

(21) Appl. No.: 15/146,491

(22) Filed: May 4, 2016

(65) Prior Publication Data

US 2016/0245360 A1 Aug. 25, 2016

Related U.S. Application Data

(63) Continuation of application No. 13/887,790, filed on May 6, 2013, now Pat. No. 9,353,860, which is a
(Continued)

(30) Foreign Application Priority Data

Nov. 9, 2010 (DE) .......................... 10 2010 050868

(51) Int. Cl.
*F16F 9/34* (2006.01)
*F16F 9/32* (2006.01)
(Continued)

(52) U.S. Cl.
CPC .......... *F16F 9/3405* (2013.01); *F16F 9/3214* (2013.01); *F16F 9/368* (2013.01);
(Continued)

(58) Field of Classification Search
CPC .......... F16F 9/3214; F16F 9/3405; F16F 9/368
(Continued)

(56) References Cited

U.S. PATENT DOCUMENTS 5,259,294 A * 11/1993 May ...................... F16F 9/3214
188/322.15
6,397,987 B1 * 6/2002 Pesch .................... F16F 9/3214
188/322.15
(Continued)

FOREIGN PATENT DOCUMENTS

DE 83 01 451.9 U1 7/1983
DE 37 01 557 A1 4/1988
(Continued)

OTHER PUBLICATIONS

European Patent Office—International Searching Authority; International Search Report and Written Opinion for corresponding Int'l Application No. PCT/EP2011/005633; 6 pages.

*Primary Examiner* — Thomas E Lazo
(74) *Attorney, Agent, or Firm* — Quarles & Brady LLP

(57) ABSTRACT

A valve component includes a first disk-shaped joining part and a second disk-shaped joining part. The first disk-shaped joining part has a first opening and has an elevation in a first region of the first disk-shaped joining part which runs at least partially peripherally around the first opening. The second disk-shaped joining part is joined to the first disk-shaped joining part and has a second opening which together with the first opening defines a channel for flow of a fluid medium therethrough. The second disk-shaped joining part further has a depression in a second region of the second disk-shaped joining part which runs at least partially peripherally around the second opening and which opposes the first region of the first disk-shaped joining part. The elevation interacts with the depression in sealing fashion.

15 Claims, 8 Drawing Sheets

Related U.S. Application Data continuation of application No. PCT/EP2011/005633, filed on Nov. 9, 2011.

(51) Int. Cl.
*F16F 9/36* (2006.01)
*F16J 1/00* (2006.01)
*F16J 1/09* (2006.01)
*F16K 31/122* (2006.01)

(52) U.S. Cl.
CPC ............... *F16J 1/005* (2013.01); *F16J 1/09* (2013.01); *F16K 31/1226* (2013.01); *Y10T 29/49252* (2015.01); *Y10T 29/49256* (2015.01)

(58) Field of Classification Search
USPC ........................................ 92/181 P, 255, 256
See application file for complete search history.

(56) References Cited

U.S. PATENT DOCUMENTS

| | | | |
|---|---|---|---|
| 7,178,237 B2* | 2/2007 | Casellas | F16F 9/368 |
| | | | 29/888.042 |
| 8,157,065 B2* | 4/2012 | Ashiba | F16F 9/348 |
| | | | 188/282.6 |
| 9,353,860 B2* | 5/2016 | Frey | F16F 9/3214 |

FOREIGN PATENT DOCUMENTS

| | | |
|---|---|---|
| DE | 198 47 341 A1 | 4/2000 |
| DE | 100 13 638 C1 | 9/2001 |
| DE | 101 08 246 A1 | 9/2002 |
| EP | 0 505 773 A1 | 9/1992 |
| EP | 0 557 548 A1 | 9/1993 |
| JP | 11 037202 | 2/1999 |

* cited by examiner

PRODUCTION OF MULTI-PART, JOINED VALVE COMPONENTS IN HYDRAULIC APPLICATIONS WITH JOINT SEALING PROFILES

CROSS-REFERENCE TO RELATED APPLICATIONS

This application is a continuation application of U.S. patent application Ser. No. 13/887,790 filed on May 6, 2013 which is a continuation application of PCT International Application No. PCT/EP2011/005633 filed on Nov. 9, 2011, and claims the benefit of German Patent Application No. 10 2010 050 868.3 filed on Nov. 9, 2010. The disclosure of each of these applications is hereby incorporated by reference as if set forth in their entirety herein.

FIELD OF INVENTION

The invention relates to a valve component, in particular for a piston or a valve, comprising at least one first disk-shaped joining part and at least one second disk-shaped joining part, wherein the first and second joining part each have at least one opening, and wherein once the joining parts have been joined, the openings of the joining parts interact in such a way that a channel is formed and a fluid medium, in particular an oil, can flow through the channel. In addition, the invention relates to a method for manufacturing a valve component.

BACKGROUND

Such valve components are known as pistons for shock absorbers, for example. A shock absorber piston is described in the document DE 37 01 557 A1. The shock absorber piston is formed from two piston halves that have a recess around their edges on the abutting faces that are in contact with one another, wherein the recess forms a circumferential groove. A piston ring is inserted into this groove. A fluid passage channel is formed in each piston half so that when the piston halves are assembled, a shock absorber piston is formed that has a through-flow channel. The piston halves are identical and are attached to the end of a piston rod by means of disk springs and supporting disks.

A further valve component in the form of a shock absorber piston is known from the document DE 100 13 638 C1. The shock absorber piston shown therein can be connected with a piston rod via a centric bore hole. In order to create a seal between the piston and the cylinder wall, the shock absorber piston has a groove around its edge, into which a piston ring is inserted. In order to create a seal, the piston ring is composed of an appropriate plastic. A supporting ring designed as an O-ring is incorporated in a further groove in the region of the joint line between the piston halves that form the shock absorber piston. The support ring is comprised of an elastically resilient material, which is compressed by the piston ring in the groove. If the piston ring forms a seal in the direction of the cylinder, the support ring serves to seal and compensate for tolerances between the piston halves. The piston halves have an identical shape, wherein projections and recesses are incorporated into the piston halves so that the piston halves can be securely and correctly positioned.

SUMMARY

The primary objective of the present invention is to provide a joined valve component in which a tight seal is achieved between the joined parts. In particular, the objective is to optimally seal the flow channels formed in the valve component against one another. Moreover, it is an objective of the invention to enable a structurally simple and cost effective solution for a sealing valve component. The objective of the invention is likewise to provide a method of manufacturing a sealing valve component.

A valve component that solves the stated objective is a valve component, in particular for a piston or a valve, comprising at least one first disk-shaped joining part and at least one second disk-shaped joining part, wherein the first and second joining part each have at least one opening, and wherein once the joining parts have been joined, the openings of the joining parts interact in such a way that a channel, in particular a through-flow channel, is formed and a fluid medium, in particular an oil, can flow through the channel, wherein an at least partially peripheral elevation and/or depression is provided in a first region of the first joining part, and an at least partially peripheral elevation and/or depression is provided in a second region of the second joining part that is opposite the first region, wherein the elevation and/or the depression interact with one another in sealing fashion once the joining parts have been joined. The inventive design of the valve component now makes it possible to seal the joining parts that form the valve component against one another. Regions on the joining parts are thereby viewed as an elevation or elevations, wherein the joining parts extend from a parting plane of the valve component that is centrally disposed, for example, in the direction of the further joining part. The parting plane is preferably located in a vertical center of the valve component. If it is assumed here, for example, that the valve component is a piston and in particular, a shock absorber piston, and that the shock absorber piston has a central through bore, through which a piston rod can be passed, a joint line may be located in a vertical center of the through bore. If elevations are designated as material accumulations that extend in a positive direction from a joint line, depressions are defined as recesses that extend in a negative direction from a joint line. A sealing profile can be formed between and with the joining parts through the interaction of regions, for example with elevations in a first joining part, with depressions in a second joining part. The joining parts thereby have at least one opening, wherein the openings present in the joining parts cooperate in such a way that a through-flow channel or channel is formed through the valve component. Thus, for example, it is possible that the valve component is disposed in a cylinder, and that can flow from one side of the valve component to the other side of the valve component by means of the through-flow channel. The cooperating depressions and/or elevations in the joining parts of the valve component a seal of the channels formed by the openings. The elevations and/or depressions can thereby be formed as partially circumferential elevations and/or depressions or as an elevation and/or depression that completely surrounds an opening, that is, a seal.

In a further embodiment, an elevation and/or depression that runs at least in part peripherally around an opening is provided in a first region of the opening of the first joining part, and an elevation and/or depression that runs at least in part peripherally around the opening is provided in a second region of the second joining part that is opposite the first region, so that the elevation and/or the depression interact with one another in a sealing fashion once the joining parts have been joined. Here, the depression and/or elevation can be disposed immediately at the opening or at a distance from the opening in the joining parts. In so doing, the opening that forms the channel can be directly sealed so that no fluid can penetrate, for example in a joint line between the joining parts. The depressions and/or elevations thereby form a labyrinthine seal, especially when there is a spacing from the opening. It is also conceivable, however, that only an outer peripheral surface of the disk-shaped valve component is provided with elevations and/or depressions. A seal is then preferably created in a radial direction. Depending on the number and size of the openings, a single seal that is circumferential and/or that extends around the openings, can be formed from elevations and/or depressions. A sealing profile is formed by means of the elevations and/or depressions that can simultaneously serve as a joining and fastening profile between the joining parts.

A further advantageous embodiment of the invention is obtained when at least two openings are formed in order to create at least two channels on the joining part or the valve component respectively, and each joining part has elevations and/or depressions. The number of openings in the valve component may vary depending on the design and purpose of the valve component. Thus valve components having one, two, three, four or more openings can be formed, wherein seal created by depressions and/or elevations can be formed at each channel created by the openings.

It can also be advantageous and can describe an embodiment of the invention when the elevations and/or depressions in the joining part alternate. Alternating and/or symmetrical disposition of the depressions and/or elevations in the joining parts make it easy to join the joining parts and in particular, symmetrically disposed elevations and/or depressions result in identical joining parts for a valve component. In terms of an alternating [configuration], it is conceivable that six openings are present in a joining part, for example, and that an elevation is formed around each opening on one side, and a depression is formed on the joining part on the other side. Thus, for example, a depression can be formed around an opening and an elevation can be formed at the next opening in an alternating fashion. An even number of openings results in ready joining, and an odd number of openings results in a unique positioning of the joining parts when joining the valve component. It is also conceivable that alternating elevations and depressions be disposed around an opening so that interlocking profiles are obtained as joining profiles.

Moreover, the elevations and/or depressions can be disposed immediately at the opening bordering on the joining part. An immediate disposition of the profile in the form of elevations and/or depressions around the opening offers the advantage that it ensures cost-effective manufacturing, since in this case, the opening itself can form a part of the interlocking profiles of elevations and/or depressions.

The openings can have a round and/or angular and/or oval cross-section shape. This list is not intended to be limiting, but merely represents embodiments, wherein the openings have a geometry corresponding to the requirements of any cross-section shape. In particular, the openings may also be designed to be tapered, or widening and tapering, or having a constant opening cross-section. Preferably round or angular cross-sections will be formed as openings in the valve component. The openings can also extend through the valve component in a linear or a curved form. Depending on the requirements on the fluid flowing through the openings, it is conceivable that the seals on the valve component be formed in any number, with any cross-section shape and any design. Thus it is conceivable, for example, that one or a few large openings be formed in order to allow for a high fluid flow through the valve component, or to form one or a few or many small openings in the valve component in order to inhibit or reduce a fluid flow through the valve component as much as possible.

In a further embodiment, the joined disk-shaped joining parts form at least one circumferential groove on a radially external surface when in a joined state, in particular a groove formed by both joining parts, wherein the elevations and/or depressions are in a region adjacent to the groove and are circumferentially disposed so that the groove is sealed against at least one through-flow channel. In particular when the valve component is inserted in an axial direction such that it can be displaced, an external circumferential groove on the valve component forms a seat for a sealing ring such as a piston ring, for example. If the piston ring acts against a cylinder, for example, the piston ring forms a seal for the valve component that has been axially moved. In addition to the piston ring, the elevations and or depressions in the joint faces of the valve component act as additional seals against leakage flow in the direction of the joint faces of the joining parts.

The valve component thereby offers the advantage that a leakage flow along the joint line or joint face of the joining parts is prevented. If a circumferential groove is advantageous in an embodiment, in particular in the case of an axial displacement of the valve component, one or more axial grooves create a further possibility of guiding and/or sealing the valve component, in order to obtain a directed fluid flow. Axial in this case means that the grooves are aligned in the direction of a central axis of the disk-shaped valve component. In addition to the formation of one or more axial grooves on the outer periphery of the valve component, it is also possible to form one or more axially displaced grooves in the parts that are to be joined.

The elevations and/or depressions extend from a joint line or joint face in a positive or negative axial direction of the disk-shaped valve component. Here, the elevations and/or depressions have an extension of 0.5 mm to 2 mm, preferably approximately 1 mm. An extension in the range between 0.5 mm and 2 mm offers the advantage of making it easier to position the joining parts together, on the one hand, and offers the advantage of making it cost-effective to manufacture the depressions and elevations in the joining parts, on the other hand. In addition, an optimum sealing effect between the parts being joined in the joint face is achieved with the elevations and depressions in the specified extension ranges.

The elevations and/or depressions can be formed by means of a cutting or non-cutting method, i.e. they can be molded into the valve component. Cutting or non-cutting methods offer the advantage of cost-effective fabrication and reproducibility. In addition, a valve component formed in this manner offers the advantage that the semi-finished products can be formed identically for the manufacture of the molded parts, which in turn has a positive effect on the manufacturing costs.

In a further advantageous embodiment of the invention, the joining parts are formed symmetrically or asymmetrically. A symmetrical design of the joining parts can also be advantageous when, for example, large numbers of valve components are needed, since identical components can thereby be joined, for example. An asymmetrical design of the joining parts, on the other hand, offers the advantage that a clear correlation, i.e. a clear orientation, can consistently be determined.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 1:
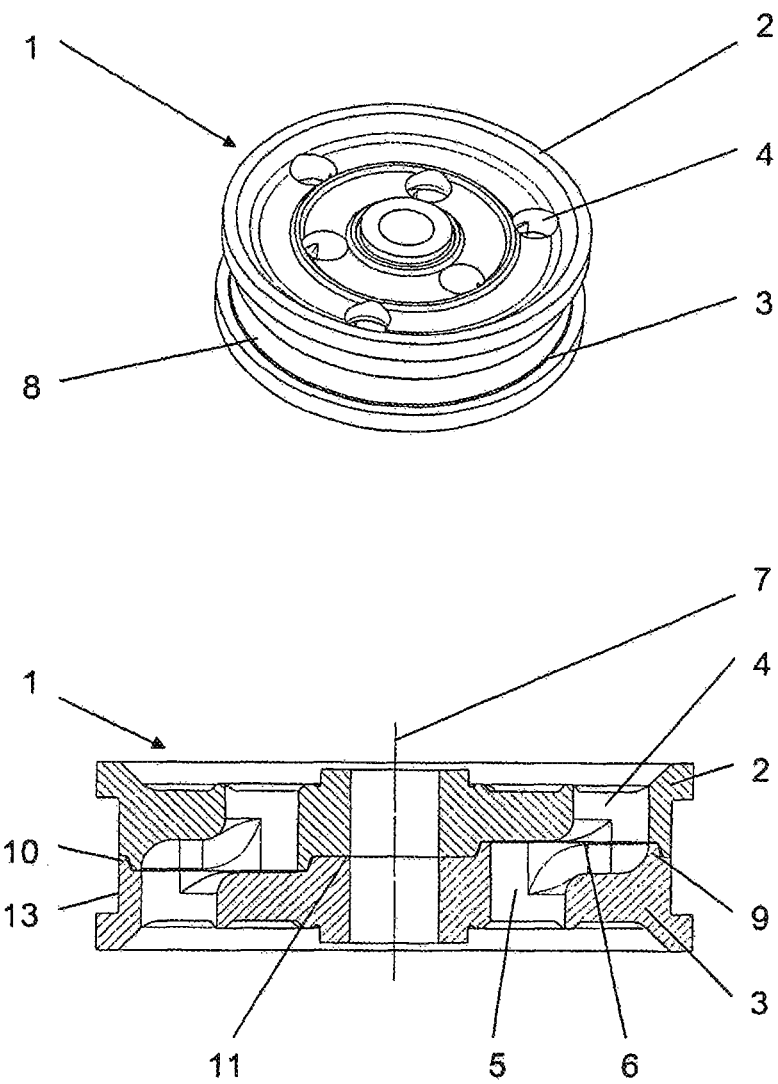
FIG. 1 is a three-dimensional view of an assembled valve component, and a cross-sectional view shown in a side view.

The upper image in FIG. 1 shows a three-dimensional view of a valve component 1 and the lower image shows a side view of a section through the valve component 1. The valve component 1 is shown as an example of a part of a shock absorber piston. The valve component is formed from a first joining part 2 and a second joining part 3. There are six openings 4, 5 formed in the joining parts 2, 3, which together create a channel or fluid passage channel 6. For the sake of clarity in FIG. 1, only one through channel 6 and the openings 4, 5 have been provided with reference numbers. The joining parts 2, 3 are structured symmetrically and have an opening 7 in the form a cylindrical cavity or bore hole. The valve component can be connected through the bore hole 7, for example with a piston rod. The valve component has a circumferential groove 8, in which, for example, a piston ring can be inserted to form a seal against a cylinder. Elevations 9 and depressions 10 are disposed circumferentially in order to seal the channel 6. Here, the elevations 9 and depressions 10 are formed at the edge of the openings 4, 5 so that the elevations 9 and depressions 10 form a part of the sealing profile. The elevations 9 and depressions 10 extend from a joint face 11 in a positive and negative direction.

The use of a valve component 1 in a single-tube shock absorber is described in the document EP 0 505 773 A1, for example, the disclosure of which is hereby declared in full to be the subject matter of this description. A valve component 1 according to the invention can be connected with a piston rod through the bore hole 7, for example. The inner inlet openings 5 can be covered and sealed by means of additional valve spring washers, which can also be referred to as spring plates. By designing the valve spring washers appropriately, the fluid passage channels 6 can be laid out for the adjustment of each damping curve, whether they are laid out in a manner that is preferably linear, progressive or degressive. In addition, there is the possibility of creating different damping characteristics for a pull side and for a push side with the aid of appropriately formed fluid passage channels 6. In other words, the damping effect and the damping characteristic of the shock absorber can be adjusted by the shape of the fluid passage channels 6 and the adjustment and type of valve spring washers. The outlet openings 5 that are located inside in terms of the bore hole 7, are sealed by means of the valve spring washers. With a corresponding direction of movement, a fluid, for example a hydraulic oil, can then flow from the inlet opening 4 through the fluid passage channel 6 and the outlet opening 5, wherein the valve spring washer releases the outlet opening 5. Here, the hydraulic oil flows from the inlet opening 4 through the fluid passage channel 6 to the discharge opening 5 when, for example, the valve component 1 from FIG. 1 moves upward. In this case, an oil flow can be subject to pre-definable pressure conditions.

Figure 2:
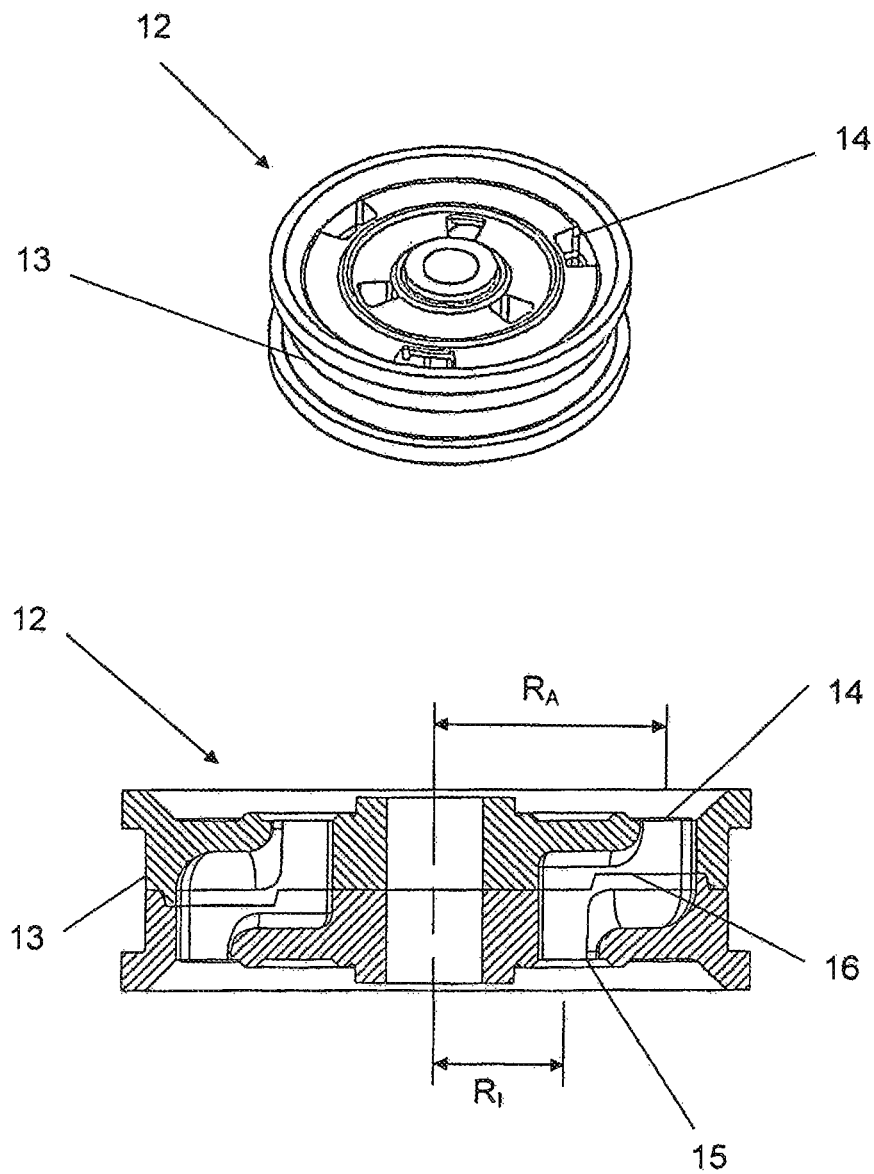
FIG. 2 is a further embodiment of a valve component in a three-dimensional view and a cross-sectional view shown in a side view.

The upper view in FIG. 2 is a three-dimensional view of a further valve component 12 in a three-dimensional view, and the lower image is a cross-sectional view of the valve component shown in a side view. Again by way of example, the valve component is designed as a shock absorber piston and has a circumferential groove 13 for receiving a piston ring, not shown. The valve component 12 has openings 14, 15 that can be described as angular, which form a channel 16. The through channel 16 serves to convey a fluid medium through the valve component, for example from the opening 15 to the opening 14. Six channels 16 are formed or incorporated in the valve component 12, wherein the channels 16 extend from an inner radius $R_1$ to an outer radius $R_4$ through the valve component 12. The opening 14 thereby lies on an outer radius $R_4$ that is larger than the inner radius $R_1$, which delineates the center point of the opening 15. The flow of the fluid medium, which may especially be an oil, can be influenced by the position and direction of the channel through the valve component 12.

Figure 3:
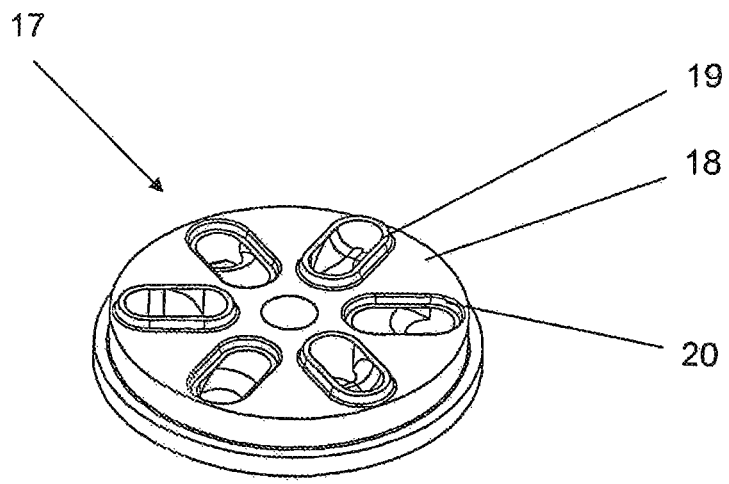
FIG. 3 is a joining part of a valve component in a three-dimensional view with depressions and elevations in the joint face and a cross-sectional view shown in a side view.
Figure 3:
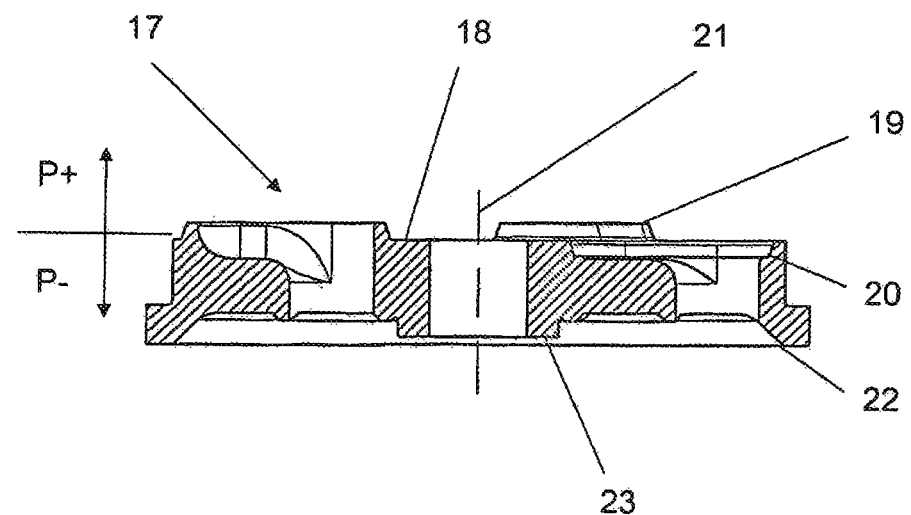

The upper image in FIG. 3 shows a three-dimensional view of a joining part 17 and the lower view shows a side view of a section of the joining part 17. Starting from a joint face 18, the elevations 19 and depressions 20 extend in a positive and negative axial direction (P+, P−) along a central axis 21 of the disk-shaped joining part 17. An axial direction refers to a direction along the central axis 21 of the joining part 17. As can be clearly seen in the bottom view of FIG. 3, the elevations 19 extend from the joint or contact surface 18 in a positive direction along the central axis 21. The depressions 20, on the other hand, extend in a negative direction along the central axis 21, as is shown by the arrows P+ and P−. Here, a preferred extension of the elevations 19 and depressions 20 falls in the range of 1 mm.

The joining part 17 is symmetrical and has alternating elevations 19 and depressions 20. The surfaces 22, 23 can serve to accommodate further components such as disk springs, valve spring washers or protective disks for example.

Figure 4:
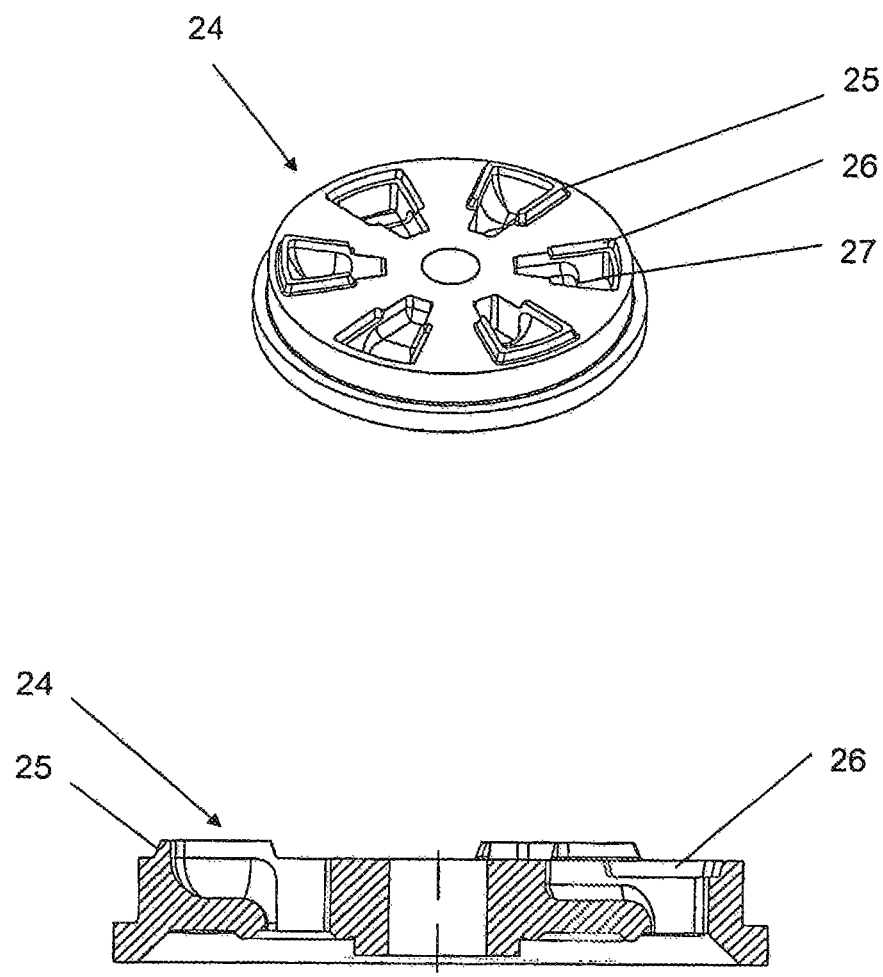
FIG. 4 is a three-dimensional view of a further embodiment of a symmetrical joining part in a three-dimensional view and in a cross-sectional view shown in a side view.

The side view in FIG. 4 shows a further embodiment of a joining part 24 and, and in the lower image a side view of a section through the joining part 24 is depicted. An embodiment of a joining part 24 is illustrated, in which the elevations 25 and depressions 26 are formed so that they are partially circumferential. The joining part 24 is again symmetrical and has an even number of openings 27, so that identical joining parts 24 can be assembled to form a valve component.

Figure 5:
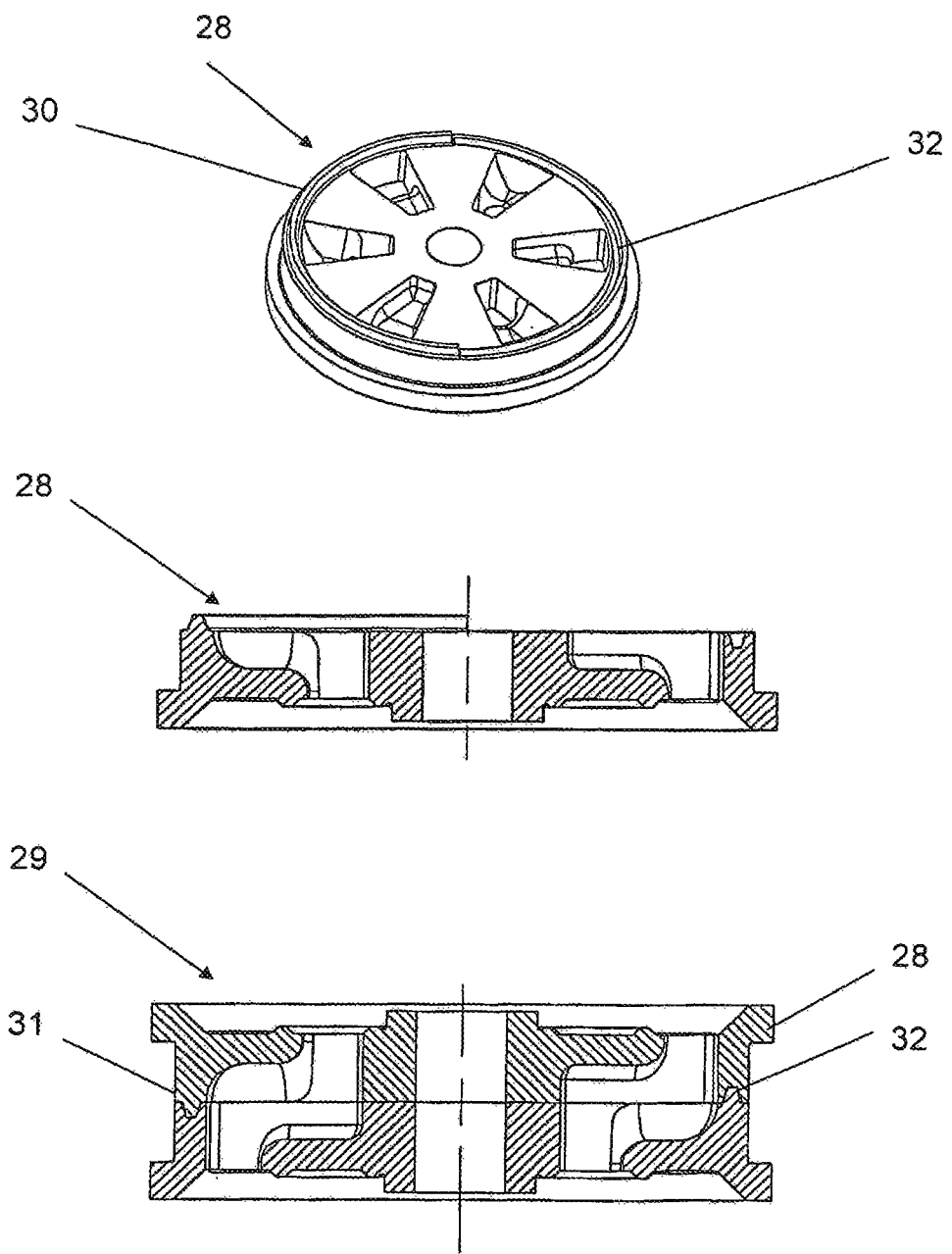
FIG. 5 is a three-dimensional view of a joining part with circumferential elevations and depressions as well as a side view in a cross-sectional view of a joined joining part as well as a further side view of the joining part shown in a cross-sectional view.

The upper image in FIG. 5 shows a view of a further embodiment of a joining part 28, the middle image shows a side view of a section through the joining part 28 and the lower image shows an assembled joining component 29 that is made up of two identical joining parts 28. The elevation 30 on the joining component 28 is inserted in the joining part 28 at a spacing from an outer groove 31 and extends along an outer radial periphery of the joining part 28. The extension of the elevation 30 extends over half the periphery of the joining part 28, so that two identical joining parts 28 can be assembled into a valve component. The depression 32 is likewise inserted in the joining part 21 at a spacing from the groove 31.

Figure 6:
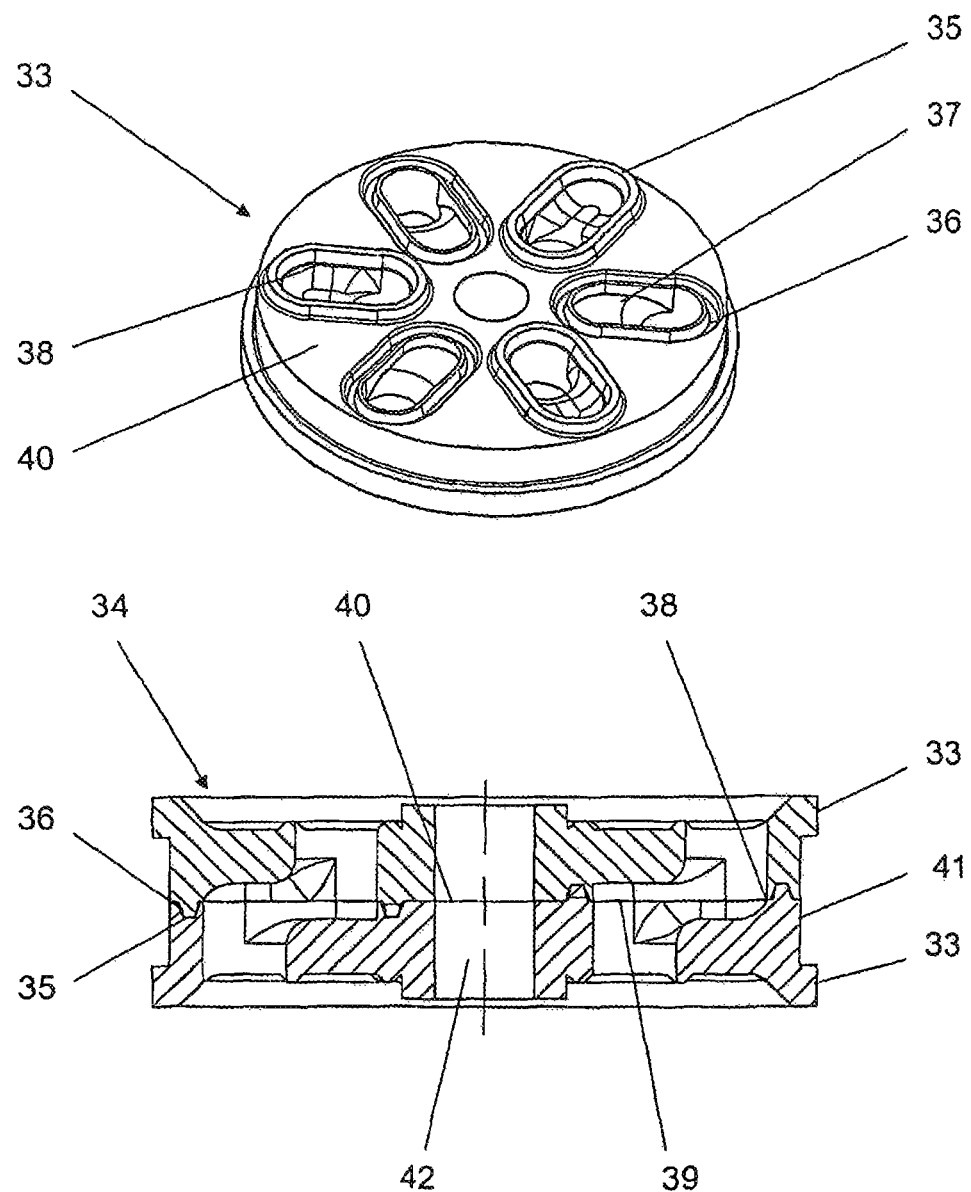
FIG. 6 is a further embodiment in a three-dimensional view with depressions and elevations along the opening and a side view shown in a cross-sectional view.

The upper image in FIG. 6 is a three-dimensional view of a further alternative embodiment of a joining part 33 and the lower view shows an assembled valve component 34 in a cross-sectional view and in a side view. The elevations 35 and depressions 36 extend along the entirety of the openings 37, wherein the elevations 35 and depressions 36 are inserted in the joining part 33 at a spacing from the edge 38 of the opening 37. The joining part 33 is preferably fabricated using a cutting and/or non-cutting process and/or my means of a powder metallurgical process, in particular a sintering process. As clearly shown in the cross-sectional view, the elevations 35 and depressions 36 form a seal, so that a fluid medium conducted through a channel 39 cannot get into the joint face between the joining parts 33. Thus leakage flows in the direction of the groove 41, the joint face 40 and the bore hold 42, are prevented. The joining parts are preferably sintered parts. Sintered parts offer the advantage of high accuracy with the lowest possible component reworking.

Figure 7:
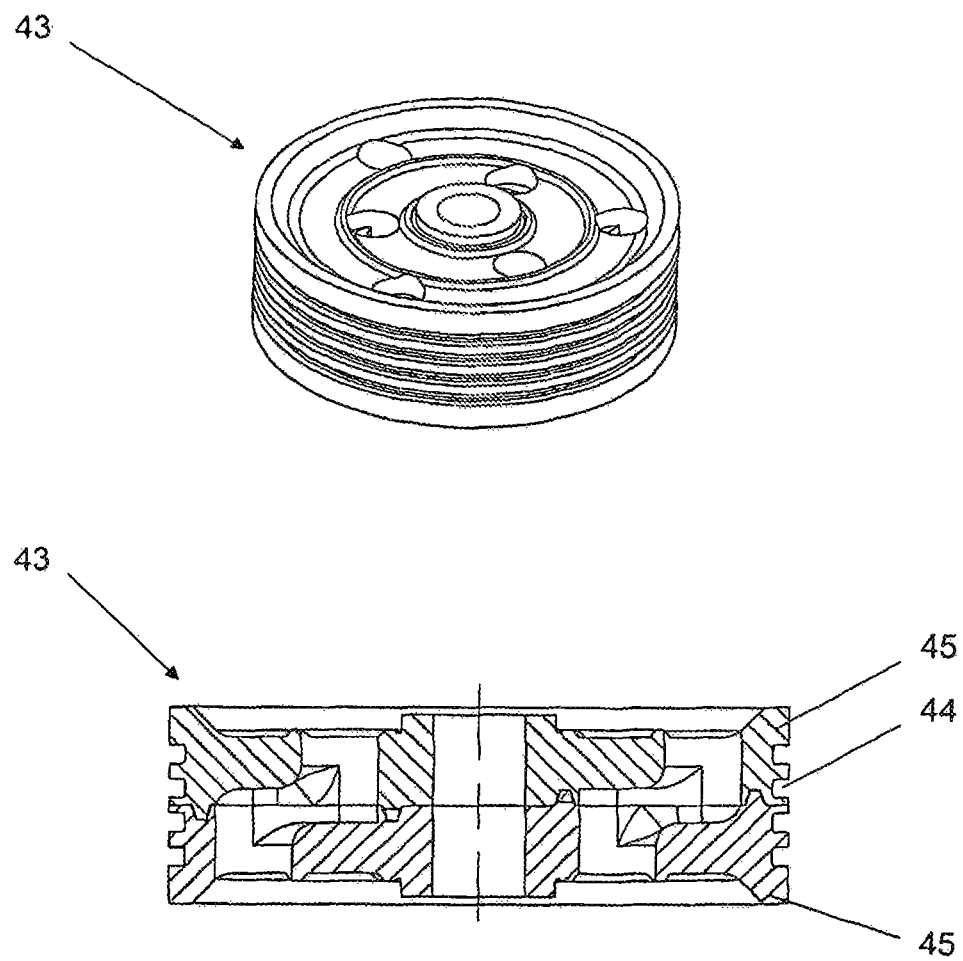
FIG. 7 is a further embodiment of a valve component in three-dimensional assembled view.

The upper image in FIG. 7 shows a three dimensional view of a further alternative embodiment of a valve component 43 and the lower image shows a side view of a cross-section. The valve component has a number of grooves 44 that make it possible to accommodate either a corresponding number of piston rings or a foil casing (PTFE foil). The grooves 44 are placed circumferentially in the joining part 43, wherein the joining parts 45 again may have a symmetrical structure.

Figure 8:
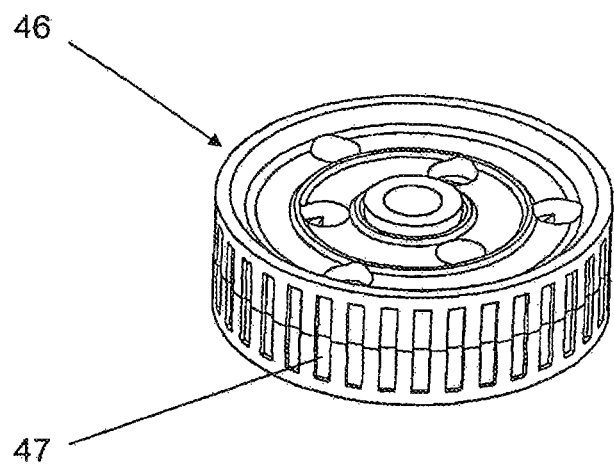
FIG. 8 is a three-dimensional view of an embodiment with axial grooves shown in a three-dimensional view.

FIG. 8 shows a three-dimensional view of a further embodiment of a valve component 46, preferably also equipped with such a piston having a sleeve-like seal. Axially extending grooves 47 are also placed in the valve component 46, wherein these grooves are placed at regular intervals and circumferentially around the outer peripheral surface in order to accommodate sealing profiles.

Figure 9:
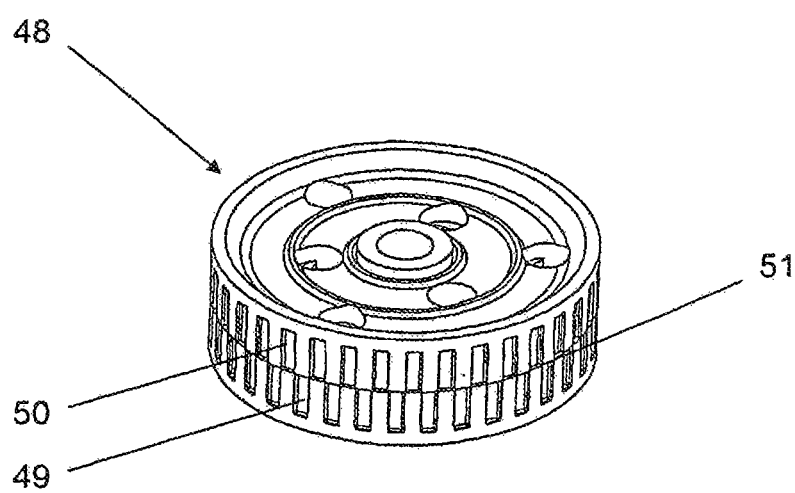
FIG. 9 is a further alternative embodiment of a valve component in a three-dimensional view with axially displaced grooves around the periphery of the valve component.

FIG. 9 again shows an alternative embodiment of a valve component 48 with grooves 49, 50 that are offset to one another. The valve component 48 clearly shows that a geometrical configuration of the valve component 48, and in particular the formation of axial as well as horizontal grooves, that is, along the contact surface or joint face 51, are not limited.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A valve component comprising:
   a first disk-shaped joining part having a first opening and having an elevation in a first region of the first disk-shaped joining part which runs at least partially peripherally around the first opening; and
   a second disk-shaped joining part joined to the first disk-shaped joining part in which the first disk-shaped joining part and the second disk-shaped joining part are symmetrical with one another, the second disk-shaped joining part having a second opening which together with the first opening defines a channel for flow of a fluid medium therethrough and further having a depression in a second region of the second disk-shaped joining part which runs at least partially peripherally around the second opening and which opposes the first region of the first disk-shaped joining part;
   wherein the elevation interacts with the depression in sealing fashion.

2. The valve component of claim 1, wherein the first opening and the second opening are one set of openings of a plurality of sets of openings that each form a channel and another set of openings having a corresponding elevation and a corresponding depression defines another channel.

3. The valve component of claim 1, wherein the first disk-shaped joining part and the second disk-shaped joining part each have a set of alternating elevations and depressions.

4. The valve component of claim 1, wherein the elevation is disposed immediately at the first opening and the depression is disposed immediately at the second opening such that the elevation and depression follow the periphery of the first opening and the second opening at a mating interface between the first disk-shaped joining part and the second disk-shaped joining part.

5. The valve component of claim 1, in which the openings have at least one of a round, angular, and oval cross-sectional shape.

6. The valve component of claim 1, in which the first disk-shaped joining part and the second disk-shaped joining part each have a circumferential groove formed on a radial external surface and in which the elevation and depression are disposed in a region that borders the circumferential groove so that the groove is against at least the one channel.

7. The valve component of claim 1, in which the elevation and depression have an extension of 0.5 mm to 2 mm.

8. The valve component of claim 1, in which the elevation and depression are designed as a deformable joining profile.

9. The valve component of claim 1, in which at least one further joining profile is introduced into at least one of the first disk-shaped joining part and the second disk-shaped joining part to allow an additional connection of the first disk-shaped joining part and the second disk-shaped joining part that stabilizes the first disk-shaped joining part and the second disk-shaped joining part relative to one another.

10. The valve component of claim 1, in which first disk-shaped joining part and the second disk-shaped joining part are sintered powder metal parts.

11. The shock absorber piston comprising the valve component of claim 1.

12. The shock absorber piston comprising a valve component of claim 1, in which during the joining process, at least one part of the elevation and the depression of the joining parts are deformed.

13. A valve component comprising:
   a first disk-shaped joining part having a first opening and having an elevation in a first region of the first disk-shaped joining part which runs at least partially peripherally around the first opening; and a second disk-shaped joining part joined to the first disk-shaped joining part, in which the first disk-shaped joining part and the second disk-shaped joining part are identical with one another, the second disk-shaped joining part having a second opening which together with the first opening defines a channel for flow of a fluid medium therethrough and further having a depression in a second region of the second disk-shaped joining part which runs at least partially peripherally around the second opening and which opposes the first region of the first disk-shaped joining part;

wherein the elevation interacts with the depression in sealing fashion.

14. A method of manufacturing a valve component, comprising:

fabricating a first disk-shaped joining part having a first opening and having an elevation in a first region of the first disk-shaped joining part which runs at least partially peripherally around the first opening;

fabricating a second disk-shaped joining part having a second opening and having a depression in a second region of the second disk-shaped joining part which runs at least partially peripherally around the second opening;

joining the first disk-shaped joining part and the second disk-shaped joining part such that the first opening and the second opening defines a channel for flow of a fluid medium therethrough wherein at least one seal of the channel is achieved through cooperation of the elevation and depression;

wherein at least one of the elevation and the depression are fabricated by cutting.

15. The method of claim 14, in which during joining, at least one part of the elevation of the first disk-shaped joining part and the depression of the second disk-shaped joining part are deformed.

* * * * *